United States Patent Office 2,939,887
Patented June 7, 1960

2,939,887
CONVERSION OF PENTAERYTHRITOL FORMALS INTO PENTAERYTHRITOL

Lucien G. Maury, Newark, and Walter P. Shyluk, Wilmington, Del., assignors to Hercules Powder Company, Wilmington, Del., a corporation of Delaware No Drawing. Filed Oct. 3, 1957, Ser. No. 687,870

4 Claims. (Cl. 260—635)

The present invention relates to a process for the hydrolytic conversion of pentaerythritol formals into pentaerythritol.

Pentaerythritol, as produced commercially, is formed by the condensation of formaldehyde with acetaldehyde in an aqueous alkaline medium. In addition to pentaerythritol, the condensation reaction also produces lesser amounts of dipentaerythritol and other compounds, among which are formals which result from the condensation of pentaerythritol and formaldehyde. Principally, these formals are pentaerythritol monoformal,

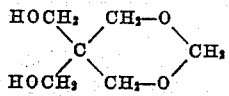

and bispentaerythritol monoformal

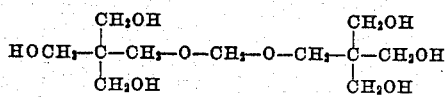

It is known that the aforesaid formals can be converted into pentaerythritol and formaldehyde by acid hydrolysis but heretofore it has not been possible to obtain a high enough yield of pentaerythritol at a reasonable reaction rate to make such conversion economically attractive.

It has been proposed, for instance, in U.S. Patent 2,464,430 to boil pentaerythritol formals with aqueous mineral acids, such as sulfuric and hydrochloric acid, to effect the desired conversion of the formals into pentaerythritol. While good yields of pentaerythritol can be obtained by this prior art process, the reaction is exceedingly slow at atmospheric boiling point. If it is attempted to accelerate the reaction by employing a higher temperature (which is achievable only at superatmospheric pressure), the mineral acid has an increasingly detrimental effect. Sulfuric acid, for instance, at elevated temperatures oxidizes pentaerythritol and chars some of the organic material that is present. Also, at higher temperatures hydrochloric acid effects partial chlorination of pentaerythritol while nitric acid decomposes pentaerythritol almost entirely.

It is the principal object of the present invention to provide a process for the hydrolytic conversion of pentaerythritol formals into pentaerythritol which is characterized by a rapid rate of reaction and a high yield of the desired product.

In accordance with the invention it has been found that the above objective can be achieved by heating a pentaerythritol formal in aqueous medium to a temperature of from about 150 to about 300° C. under autogenous, i.e., self-generated, pressure in the presence of a petroleum cracking catalyst comprising a composite of silica and a metal oxide and simultaneously withdrawing steam and formaldehyde while maintaining a water concentration of at least 30% based on the weight of organic materials present.

The following examples are presented for the purpose of illustrating the invention. Parts and percentages are by weight unless otherwise specified.

Example 1

Into an autoclave there was charged 25 parts of pentaerythritol monoformal, 100 parts of water and 25 parts of a powdered, synthetic, coprecipitated silica-alumina cracking catalyst having a silica:alumina ratio of 87:13. The autoclave was heated to 185–195° C. under autogenous pressure and steam at a pressure of 150–190 p.s.i.g. was pumped into the autoclave through a sparge tube in the bottom of the autoclave, while steam and formaldehyde vapors were allowed to escape through a pressure relief valve at the top of the autoclave. The reaction was continued for four hours, during which time 1060 parts of steam was pumped to the reactor and 1012 parts of steam and formaldehyde was evolved from the reactor.

The autoclave and its contents were next cooled to a temperature of about 25° C. and the contents was filtered to remove the silica-alumina composite. The filtrate was evaporated to dryness and the dried crude product in the amount of 22 parts was extracted with acetone to dissolve unreacted pentaerythritol monoformal. The residue from the extraction in the amount of 16.4 parts was identified as pentaerythritol, melting point 203–260° C. The recovery of the above amount of pentaerythritol represents a conversion of 71% and a productivity (parts product/parts starting material) of 0.66.

Example 2

Following the procedure of Example 1, there was employed in place of pentaerythritol monoformal as the starting material a dried waste liquor (total solids—99%, total formaldehyde—12.5%) obtained from the manufacture of pentaerythritol by reaction of acetaldehyde and formaldehyde, the waste liquor comprising essentially a mixture of a major amount of pentaerythritol formals and about 15% pentaerythritol and dipentaerythritol. The charge to the autoclave consisted of 50 parts of the waste liquor, 100 parts of water and 37.5 parts of the same silica-alumina cracking catalyst employed in Example 1 except in pellet form. The reaction was carried out for four hours as above, during which time 810 parts of steam was pumped to the autoclave which was maintained at a temperature of 220° C. at a pressure of 335 p.s.i.g. During the reaction there was evolved 786 parts of water and 5.6 parts of formaldehyde.

The amount of crude product isolated by the procedure of Example 1 was 41 parts and the residue after acetone extraction amounted to 34.7 parts. It was identified as technical pentaerythritol, melting point 195–205° C., representing a productivity of 0.69.

Example 2A

The procedure of Example 2 was followed except that the silica-alumina catalyst was omitted. There was no detectable yield of pentaerythritol.

Example 2B

The procedure of Example 2 was followed with the exception that the reaction temperature was lowered to 140° C. which is below the minimum temperature previously specified for the process of the invention. As a result of the lower temperature, the productivity was only approximately 0.2.

Example 3

Following the procedure of Example 1, there was charged to the autoclave 50 parts of the dry waste liquor described in Example 2, 37.5 parts of an acid activated bentonite clay having a particle size of −75 +200 mesh and 100 parts of water. The reaction was carried out for four hours at about 190° C. under autogenous pressure, during which time 1210 parts of steam was pumped into the reaction mixture and there was evolved 1208 parts of water and 6.2 parts of formaldehyde.

The amount of crude product isolated by the procedure of Example 1 was 44.3 parts and the residue after acetone extraction amounted to 21.3 parts. This residue was identified as technical pentaerythritol—melting point 180–220° C., a productivity of 0.43.

*Example 4*

The procedure of Example 1 was followed with the exception that the silica-alumina catalyst was replaced with an equal amount of a synthetic silica-magnesia cracking catalyst in powdered form which had been prepared by the precipitation of magnesia on preformed silica. The productivity was approximately the same as in Example 1.

As has been illustrated, the process of the invention comprises heating a pentaerythritol formal such as pentaerythritol monoformal or bispentaerythritol monoformal in aqueous medium to a temperature of from about 150 to about 300° C. under autogenous pressure in the presence of a petroleum cracking catalyst comprising a composite of silica and a metal oxide, and simultaneously withdrawing steam and vaporized formaldehyde while maintaining a water concentration of at least 30% based on the weight of organic materials in the reaction mixture. As is obvious, the pentaerythritol formal can be treated in the form of a pure compound or in impure form such as the form of wastes obtained in the manufacture of pentaerythritol.

It is, of course, essential that the process of the invention be carried out in aqueous medium, since water is necessary for the hydrolysis of the pentaerythritol formal. A practical minimum of 30% water, based on the weight of organic materials in the reaction mixture, has been established for satisfactory performance of the process and this minimum should be maintained throughout the reaction. On the other hand, the maximum amount of water that can be present is primarily an economic consideration and is limited only by the size of the available equipment and the desirability of carrying out the process with minimum heat input.

The specified range of temperature under which the reaction can be carried out is imposed on one hand by the practical consideration of obtaining a reasonably high yield of pentaerythritol in a reasonable length of time and, on the other hand, by the thermal stability of pentaerythritol itself. Thus, the employment of a temperature below the minimum permitted by the invention results in a reaction so slow as to be impractical, and a reaction temperature higher than that specified results in decomposition of pentaerythritol as it is formed so that the yield is adversely affected.

The pressure under which the process is carried out is controlled by the vapor pressure of water at the reaction temperature since it is necessary to allow steam and vaporized formaldehyde to escape from the reacting mixture as the reaction proceeds. This requires the employment of equipment which can withstand superatmospheric pressures and which is provided with pressure relief means to permit the escape of steam and formaldehyde vapor. A wide selection of commercially available equipment is available for this purpose.

The preferred method of supplying heat to the reaction mixture comprises introducing high pressure steam as the reaction proceeds since this method maintains the desired concentration of water as well as supplying heat. Alternatively, the reaction mixture can be heated by heating the reactor but in such case it is necessary to take care that the reaction mixture does not become too low in water content and, consequently, it may be necessary to add water or steam as the reaction proceeds or to employ initially a more dilute solution of pentaerythritol formal than is required when steam injection is employed for heating.

The composites of silica and a metal oxide which are useful in the invention are known materials which have long been in use as catalysts for the cracking of petroleum hydrocarbons. These composites may be of natural or synthetic origin. Those of natural origin include principally activated clays of the montmorillonite variety and various zeolites. Those of synthetic origin include composites of silica and a metal oxide such as alumina, zirconia, thoria, magnesia, titania, ceria, etc.

Suitable synthetic composites of silica and metal oxides for use in the invention can be prepared by any of several procedures. They can be made, for example, by commingling an acid, such as hydrochloric or sulfuric, with commercial water glass to precipitate silica, washing with acidulated water or otherwise to remove sodium ions, commingling therewith a metal salt such as aluminum chloride, magnesium chloride, aluminum sulfate, etc., and then precipitating the metal oxide on the already formed silica. Another procedure comprises combining an alkaline solution of sodium silicate with an acid solution containing a hydrolyzable salt of a metal in such a manner that the combined solutions contain excess acid, whereby a metal oxide and silica are coprecipitated. Other methods of preparing useful composites of silica and a metal oxide are described, for instance, in U.S. Patents 2,300,106, 2,302,297, 2,472,831–4, 2,478,519, 2,688,002 and 2,763,622.

From the standpoint of composition, the composites of silica and a metal oxide that are useful in the invention contain from about 20–95% by weight of silica, with the remainder comprising a metal oxide or combination of metal oxides. Generally speaking, the relative activities of the silica-metal oxide composites in the process of the invention can be prejudged from their known cracking activities since there has been found to be a direct relationship between cracking activity and activity as a catalyst in the process of the invention. From a practical standpoint, the preferred catalyst for use in the invention is a synthetic composite of silica and alumina, the use of which has been illustrated in the preceding examples. This preference stems from the fact that such composites give excellent results in the process of the invention, are readily available and of relatively low cost.

One of the outstanding advantages of the invention, in addition to providing a relatively rapid reaction and good yield of the desired product, is that the same silica-metal oxide composite can be recycled an undetermined number of times. Working batchwise, for example, a given quantity of silica-alumina composite was reused four times without any measurable loss of activity and without reactivation.

There are numerous modifications of the invention which will be apparent to those skilled in the art. The process, for example, can be operated continuously instead of batchwise as illustrated in the examples. In continuous operation, there is preferably employed a reaction vessel that is provided with an overhead vapor line provided with a back pressure controller and a bottom product line also provided with a back pressure controller. The reactor can be packed or filled with the cracking catalysts and an aqueous solution of a pentaerythritol formal can be pumped downwardly through the catalyst bed and out the bottom of the reactor while high pressure steam is passed upwardly through the reactor in countercurrent flow to the aqueous formal solution while steam and formaldehyde vapors are removed from the top of the reactor.

The amount of cracking catalyst employed in the invention is widely variable. In batch operation it is convenient to employ from about 1 to 200% based on the weight of pentaerythritol formal that is to be treated. In a continuous process the amount of cracking catalyst can be in the same range in relationship to the amount of pentaerythritol formal that is undergoing reaction at any given moment.

What we claim and desire to protect by Letters Patent is:

1. The process of preparing pentaerythritol which comprises heating a pentaerythritol formal in aqueous medium to a temperature of from about 150 to about 300° C. under pressure equal to the vapor pressure of water at the stated temperature in the presence of a petroleum cracking catalyst comprising a composite of silica and a metal oxide selected from the group consisting of alumina, zirconia, thoria, magnesia, titania and ceria, and simultaneously withdrawing steam and vaporized formaldehyde while maintaining a water concentration of at least 30% based on the weight of organic materials present.

2. The process of claim 1 in which the pentaerythritol formal is pentaerythritol monoformal.

3. The process of claim 1 in which the pentaerythritol formal comprises a waste liquor obtained during the manufacture of pentaerythritol by the reaction of formaldehyde and acetaldehyde.

4. The process of claim 1 in which the petroleum cracking catalyst is a synthetic composite of silica and alumina.

References Cited in the file of this patent

UNITED STATES PATENTS

| | | |
|---|---|---|
| 2,078,534 | Groll et al. | Apr. 28, 1937 |
| 2,122,813 | Groll et al. | July 5, 1938 |
| 2,139,115 | Engs | Dec. 6, 1938 |
| 2,223,421 | Hubacher et al. | Dec. 3, 1940 |
| 2,307,894 | Mikeska | Jan. 12, 1943 |
| 2,413,802 | Tollefson | Jan. 7, 1947 |
| 2,426,017 | Hamblet et al. | Aug. 19, 1947 |
| 2,421,862 | Arundale et al. | June 10, 1947 |
| 2,464,430 | Barth et al. | Mar. 15, 1949 |

FOREIGN PATENTS

| | | |
|---|---|---|
| 560,165 | Great Britain | Mar. 23, 1944 |

OTHER REFERENCES

Mantell: "Adsorption," 2nd edit. (1951), McGraw-Hill, N.Y.; pp. 45, 46, 66–9.

Walker: "Formaldehyde," 2nd edit. (1953), Reinhold, N.Y.; pp. 103–11.

Brooks et al: "The Chemistry of Petroleum Hydrocarbons," vol. II, Reinhold, N.Y., 1955; pp. 178–81.